(12) United States Patent
Stafford, IV (10) Patent No.: US 11,571,089 B2
(45) Date of Patent: Feb. 7, 2023

(54) FIRE STARTER TUBE

(71) Applicant: Walter Alexander Stafford, IV, Florence, SC (US)

(72) Inventor: Walter Alexander Stafford, IV, Florence, SC (US)

( * ) Notice: Subject to any disclaimer, the term of this patent is extended or adjusted under 35 U.S.C. 154(b) by 290 days.

(21) Appl. No.: 16/522,706

(22) Filed: Jul. 26, 2019

(65) Prior Publication Data

US 2021/0022550 A1    Jan. 28, 2021

(51) Int. Cl.
*A47J 37/07* (2006.01)
*C10L 5/36* (2006.01)
*C10L 11/04* (2006.01)

(52) U.S. Cl.
CPC ......... *A47J 37/0768* (2013.01); *A47J 37/079* (2013.01); *C10L 5/368* (2013.01); *C10L 11/04* (2013.01)

(58) Field of Classification Search
CPC ..... A47J 37/0768; A47J 37/079; C10L 5/368; C10L 11/04; C10L 2230/06; C10L 11/06
See application file for complete search history.

(56) References Cited

U.S. PATENT DOCUMENTS

| | | |
|---|---|---|
| 3,010,809 A | 11/1961 | Peck |
| 3,491,743 A | 1/1970 | Temp |
| 3,682,154 A | 8/1972 | Mollere |
| 7,789,919 B2 * | 9/2010 | Helms, Jr. ............... C10L 5/361 44/530 |
| 10,327,590 B1 * | 6/2019 | Moore .................. A47J 37/079 |
| 2013/0232862 A1 * | 9/2013 | Wilgus ..................... F23L 1/00 44/522 |
| 2015/0315508 A1 * | 11/2015 | Ho ........................ A47J 37/079 431/6 |

FOREIGN PATENT DOCUMENTS

| | | |
|---|---|---|
| DE | 202017105581 | 9/2017 |
| EP | 0943276 | 9/1999 |
| FR | 2827296 | 11/2001 |
| JP | 3217816 | 9/2018 |

* cited by examiner

*Primary Examiner* — Cephia D Toomer
(74) *Attorney, Agent, or Firm* — B. Craig Killough (57) ABSTRACT

A flammable tube has a plurality of air passages formed along the length of the flammable tube. A support member is positioned in an interior of the flammable tube. The support member is spaced apart from the lower end of the flammable tube. Solid fuel is positioned on the support member. A flame is introduced to the solid fuel which is within the interior of the tube which ignites the solid fuel, such as charcoal. The charcoal burns away the flammable tube and the support member. The flammable tube may be placed within a grill of the type used to cook food or other container that is nonflammable, and which provides a receptacle for the burning solid fuel without the need of a specialized grilling apparatus.

20 Claims, 7 Drawing Sheets

FIRE STARTER TUBE

BACKGROUND OF THE INVENTION

Solid fuels such as charcoal may be ignited and used as sources for heat. Commonly, charcoal is used for cooking food. The solid fuel is ignited, and food is placed over the fuel which provides heat for cooking food. Charcoal and other solid fuels may also be used as a heat source for other purposes, including heating for living spaces.

Charcoal and other solid carbon based fuels are frequently messy to handle. There is a need for a package for charcoal and other solid fuels that is convenient and provides an easy way to ignite the solid fuel, but does not require physical handling of the solid fuel.

SUMMARY OF THE INVENTION

The present invention is a combustible or flammable tube that comprises a plurality of air passages formed along the length of the flammable tube. A support member is positioned in an interior of the flammable tube. The support member is spaced apart from the lower end of the flammable tube.

Solid fuel is positioned on the support member. A flame is introduced to the solid fuel which is positioned within the interior of the tube. The flame ignites the solid fuel, such as charcoal. The charcoal burns away the flammable tube and the support member.

The flammable tube may be placed within a grill of the type used to cook food. The flammable tube may also be positioned within a metal pan or container that is nonflammable, which provides a receptacle for the burning solid fuel without the need of a specialized grilling apparatus.

DESCRIPTION OF PREFERRED EMBODIMENTS

Figure 1:
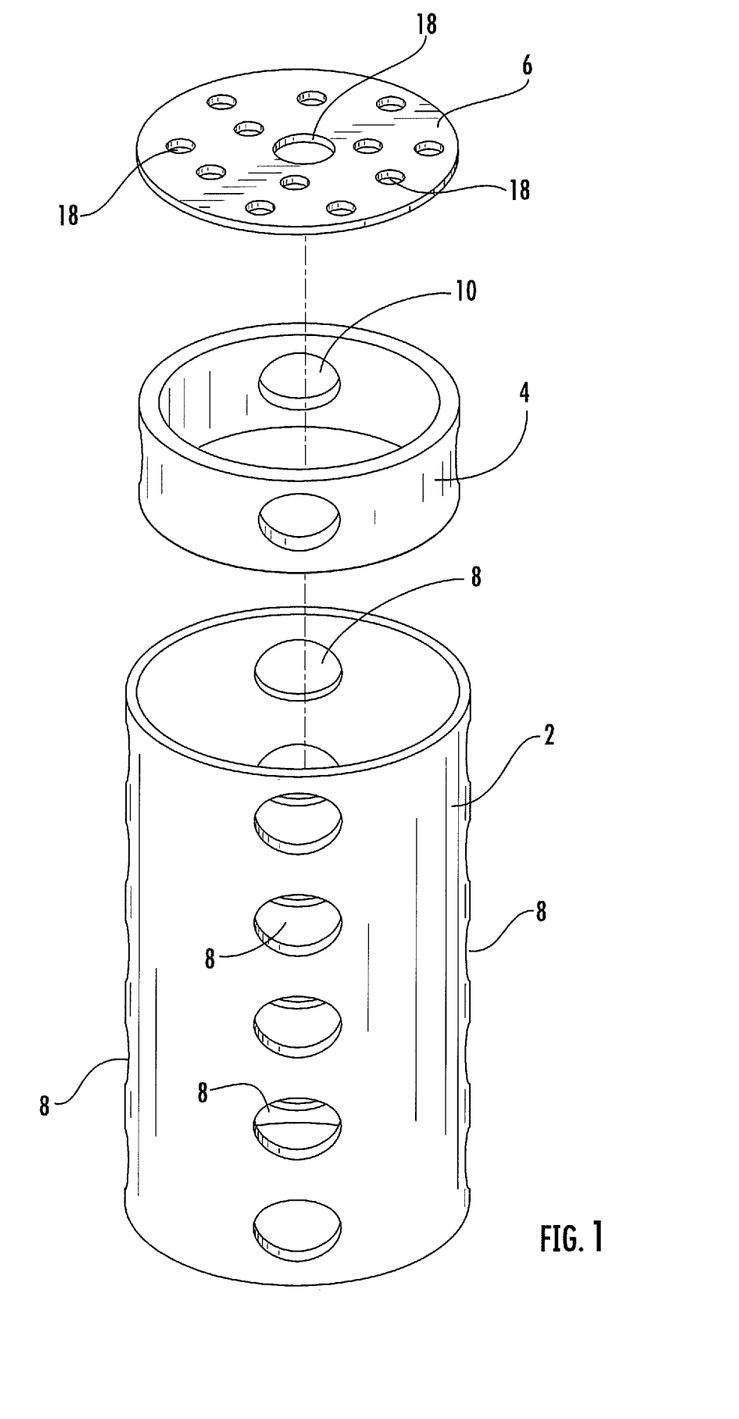
FIG. 1 is an exploded view of the fire starter tube according to the invention showing basic elements of the fire starter tube.
Figure 2:
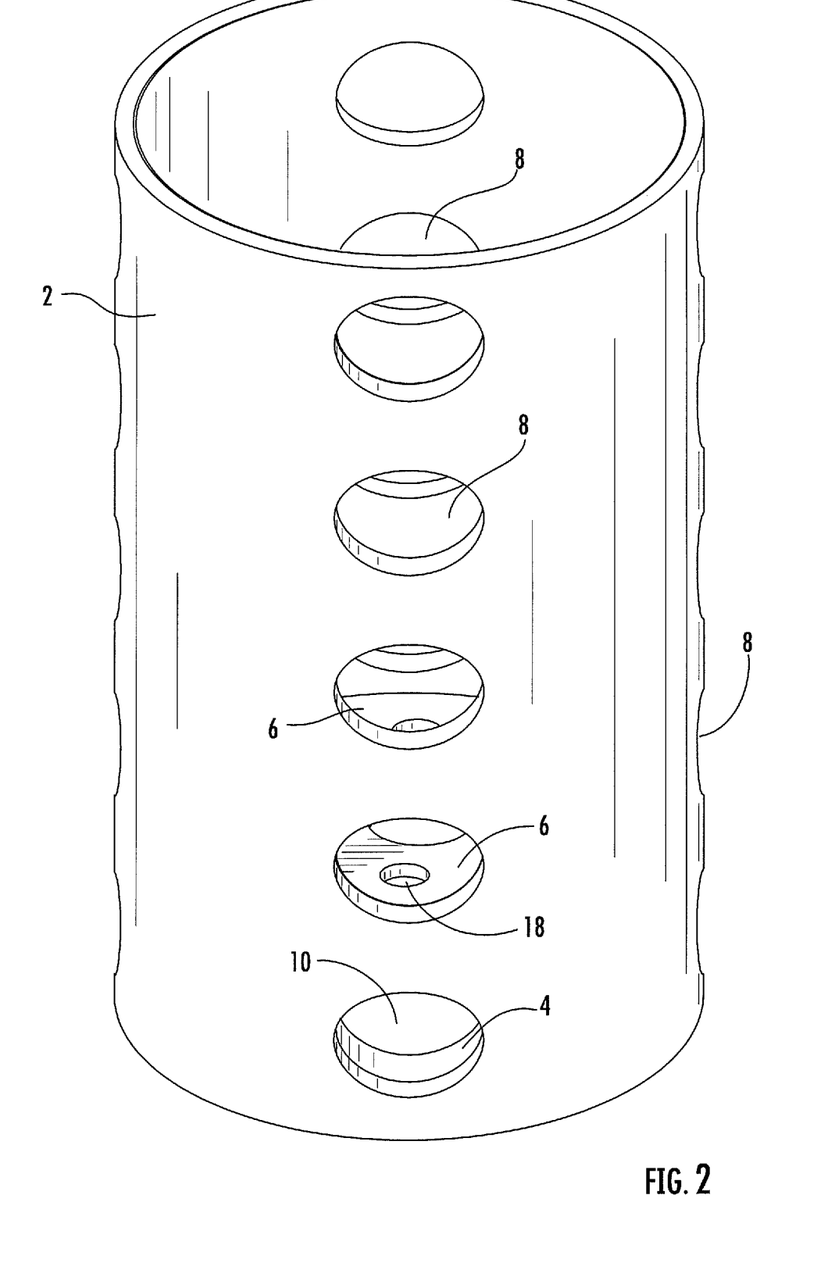
FIG. 2 is a perspective view of the fire starter tube with the basic elements assembled therein.

FIG. 1 shows basic elements of the fire starter tube according to a preferred embodiment of the invention. Combustible or flammable tube 2 houses other elements of the invention. In a preferred embodiment, the tube 2 has a series of vertical holes or voids 8 that extend substantially from near a top of the tube to near a bottom of the tube and provide air passages for combustion of the solid fuel. In a preferred embodiment, the series of vertical holes are spaced apart at about ninety (90°) degrees around the circumference of the tube so as to be present on four sides of the tube. The flammable tube may be cylindrical, but is not required to be cylindrical.

The flammable tube 2 may be formed by cutting a longer tube to the desired length, and punching the vertical holes in the flammable tube by known techniques. The flammable tube is preferred to have a diameter of 2 inches to 14 inches. The wall thickness of the flammable tube is preferred to be from 0.02 to 0.5 inches. In a preferred embodiment, the flammable tube has a diameter of about 6 inches, and a wall thickness of about 0.09 inches.

In a preferred embodiment, the flammable tube 2 is a paper tube. Paper tubes are typically fabricated from wood pulp in the form of cardboard, craft paper, paper board or fiber board. A preferred material for forming the flammable tube is uncoated recycled paper.

The basic components of the fire starter tube as shown in FIG. 1 include a second combustible or flammable tube 4 and a support member 6. As with the flammable tube 2, the second flammable tube and the support member are formed of paper and may formed from the same types of paper from which the flammable tube is formed.

The second flammable tube 4 has an outside diameter that is matched to the inside diameter of the flammable tube 2, so that the support member is positioned in a lower portion of the interior of the flammable tube. The second flammable tube is preferred to fit within the interior of the flammable tube such that friction between the tubes holds the second flammable tube in place within the interior of the flammable tube. In a preferred embodiment, the second flammable tube is positioned so that the lower or bottom surface of the second flammable tube 4 is flush with the bottom or lower surface of the flammable tube 2.

The second flammable tube 4 has holes 10 formed therein that preferably align with one or more lower holes 8 of the flammable tube 2. As with the flammable tube, in a preferred embodiment, the second flammable tube may have holes positioned ninety degrees (90°) apart around the circumference of the second flammable tube.

The second flammable 4 tube acts to support the flammable tube 2 as the solid fuel 12 within the flammable tube burns. The wall thickness of the second flammable tube is preferred to be greater than the wall thickness of the flammable tube. The wall thickness of the second flammable tube may be from 0.02 to 0.5 inches. The presence of the second flammable tube at the bottom or lower portion of the tube construct, and the second flammable tube having a greater wall thickness than the flammable tube, means that the lower portion of the tube construct burns away more slowly than the upper portion of the flammable tube 2. The second flammable tube provides support for the flammable tube and the solid fuel as the flammable tube burns, and keeps the flammable tube from tipping over as the construct burns.

A support member 6 is positioned over the second flammable tube 4. The support member supports the solid fuel, such as charcoal 12. The support member rests on and above the second flammable tube, with the second flammable tube keeping the support member spaced apart from the bottom of the construct. With the solid fuel spaced apart from and above the bottom of the construct, access is provided for igniting the solid fuel from underneath the support member. Air for combustion is received through the holes in the tube construct.

In a preferred embodiment, charcoal 12 is positioned inside the flammable tube 2 and over the support member 6.

Figure 7:
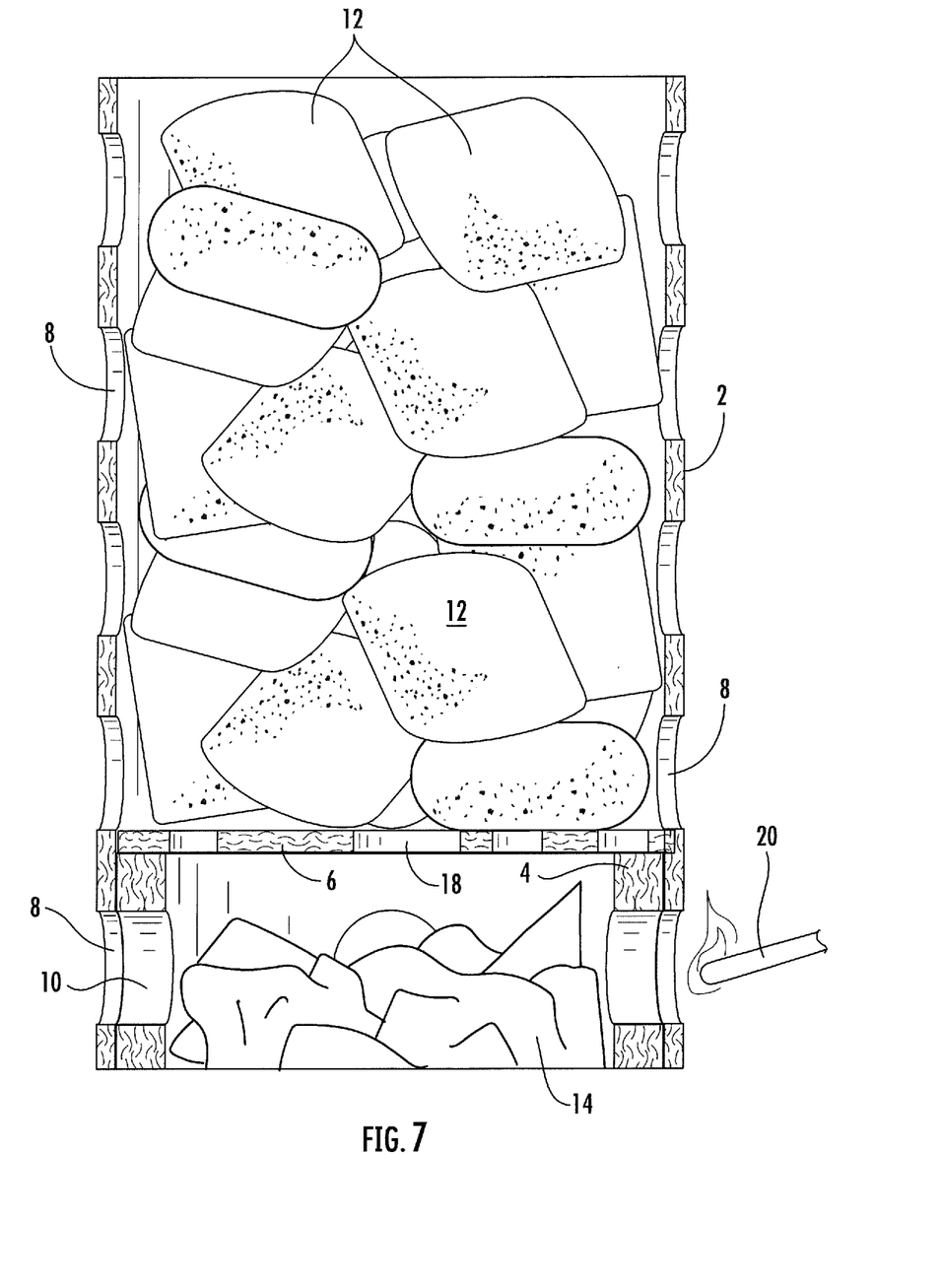
FIG. 7 is a side sectioned view of the fire starter tube with solid fuel such as charcoal positioned therein.
Figure 8:
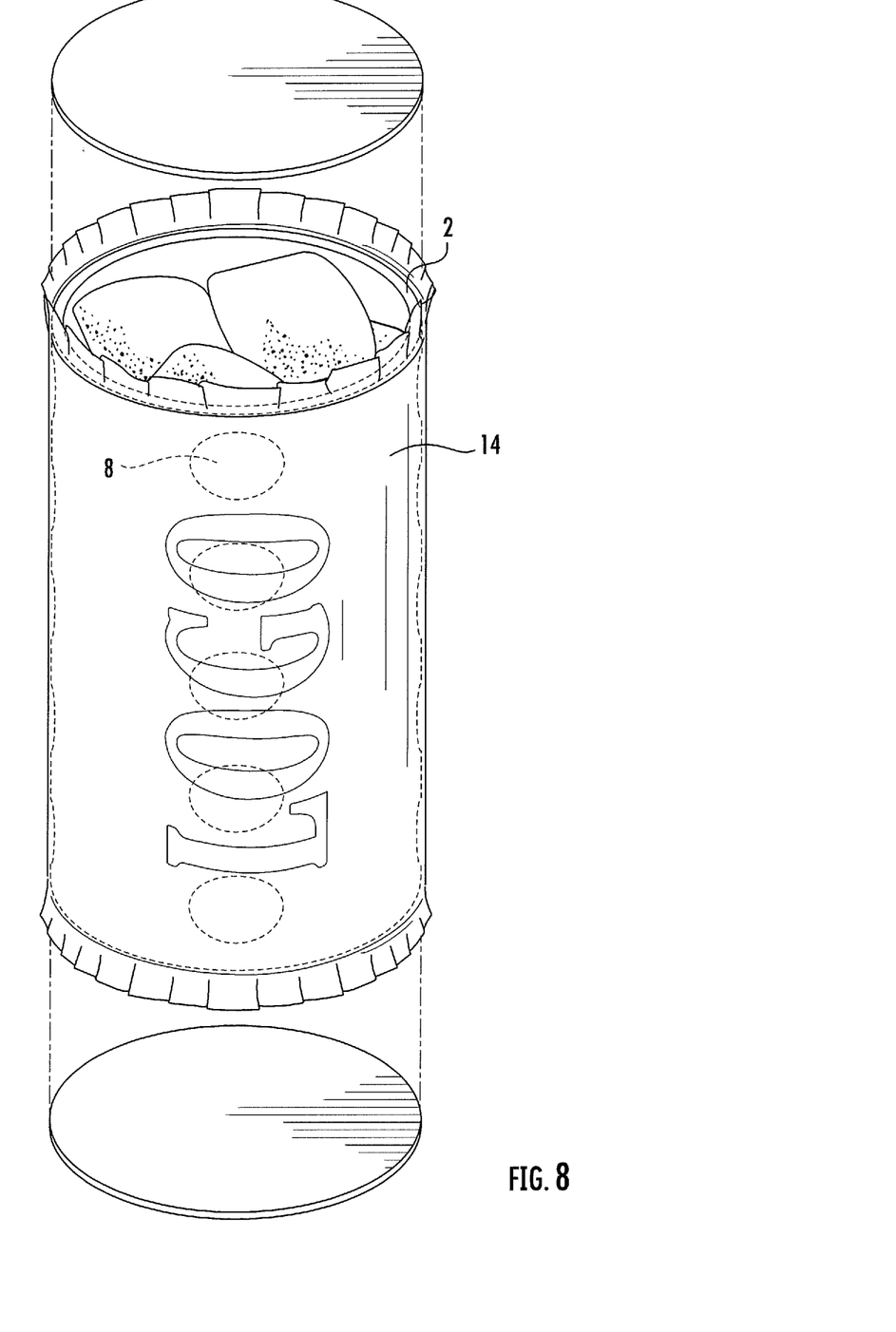
FIG. 8 is a perspective view of the fire starter tube according to the invention showing an outer wrap surrounding the fire starter tube.

FIG. 7. An outer wrap or covering, which may be a label 14 showing a brand name, logo, and other information about the product, may be positioned over the outer surface of the flammable tube. The label not only provides information about the contents and the source of the contents, it also covers the holes in the flammable tube for shipping and helps retain the solid fuel within the flammable tube.

The label 14 is preferred to be formed of a combustible or flammable material, such as paper from which labels for canned goods and the like are made. An end cap or lid is placed over the top of the flammable tube 2 to hold the charcoal 12 within the interior of the flammable tube during shipping of the product. The end cap is preferred to be formed of a flammable material such as paper or plastic that is strong enough to prevent the solid fuel such as charcoal from exiting the flammable tube during shipping. An end cap or lid may also be positioned over the lower end of the flammable tube. Forming the end caps of a combustible material such as paper allows them to burn away so that other means of disposal is not necessary.

Figure 3:
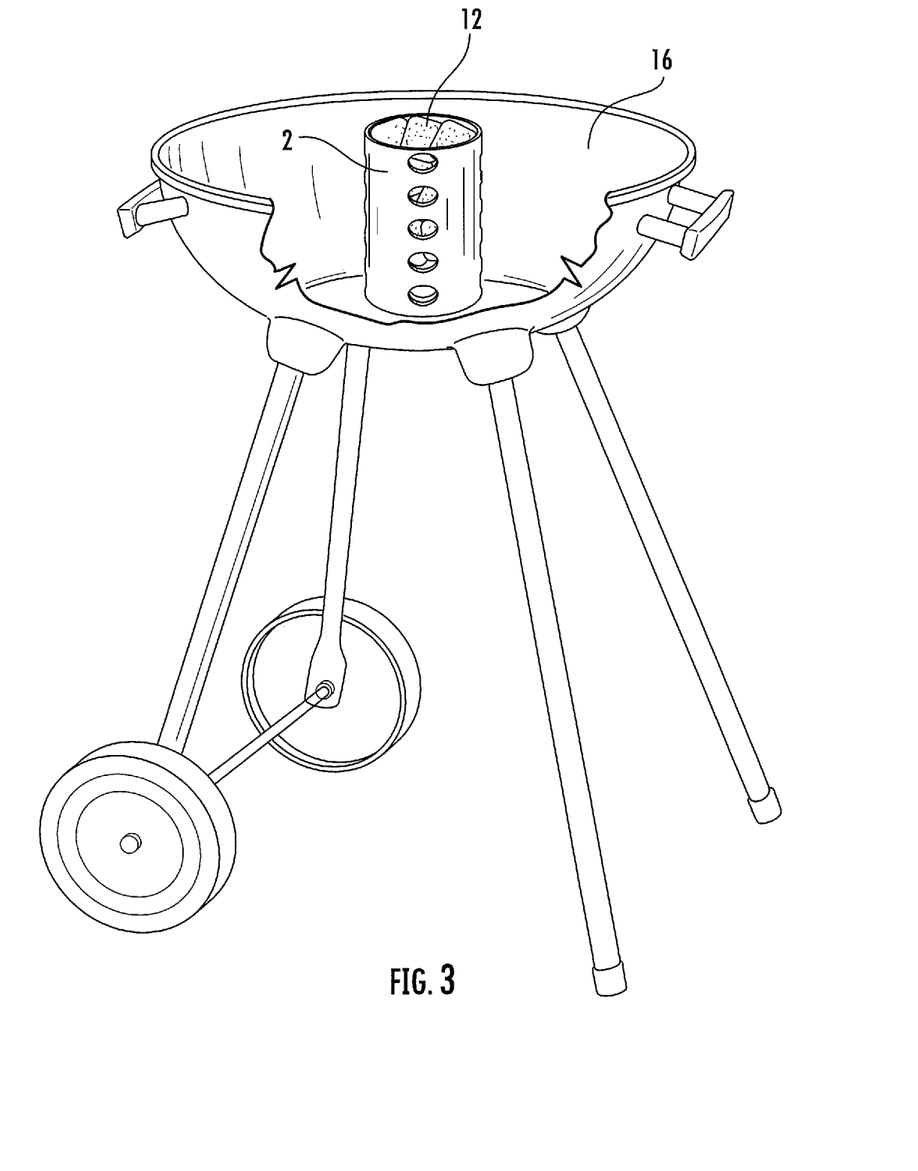
FIG. 3 demonstrates the fire starter tube according to the invention placed within a grill for cooking.
Figure 4:
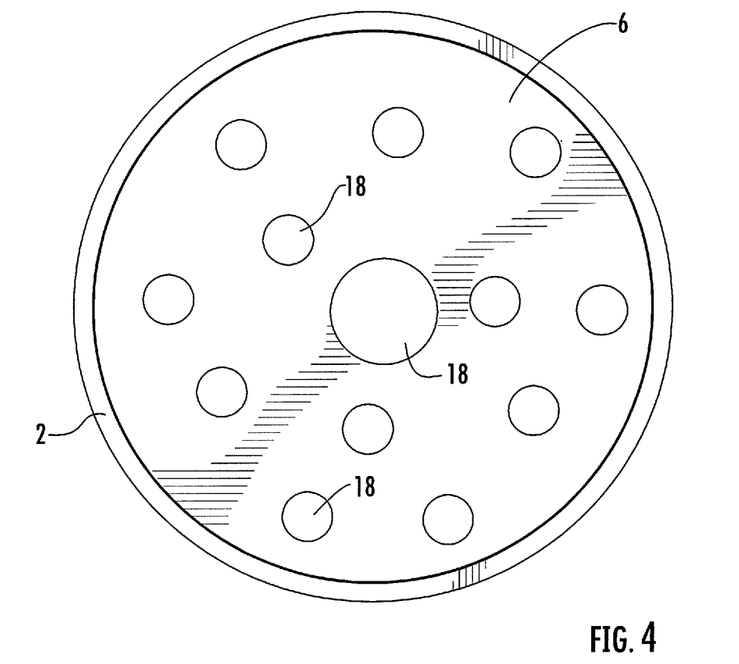
FIG. 4 is a top plan view of basic elements of the fire starter tube.
Figure 5:
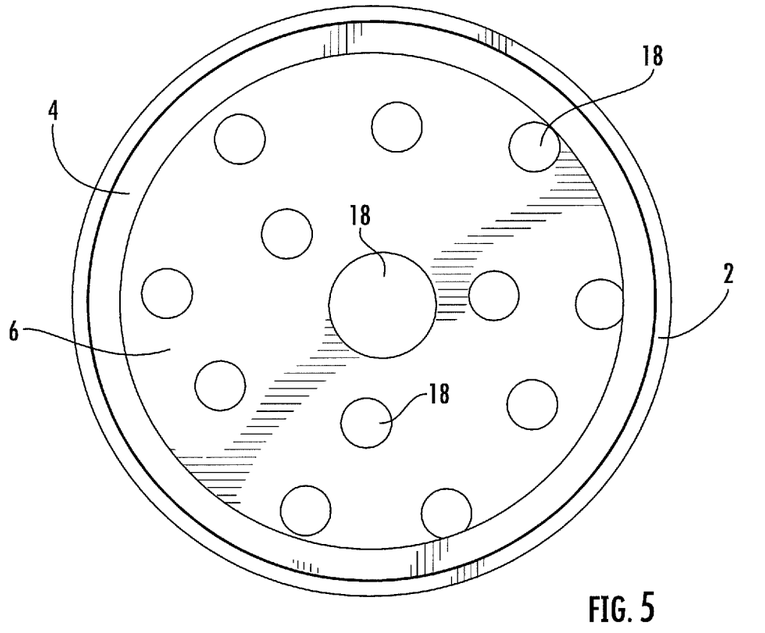
FIG. 5 is a bottom plan view of the fire starter tube according to the invention in showing the basic elements.
Figure 6:
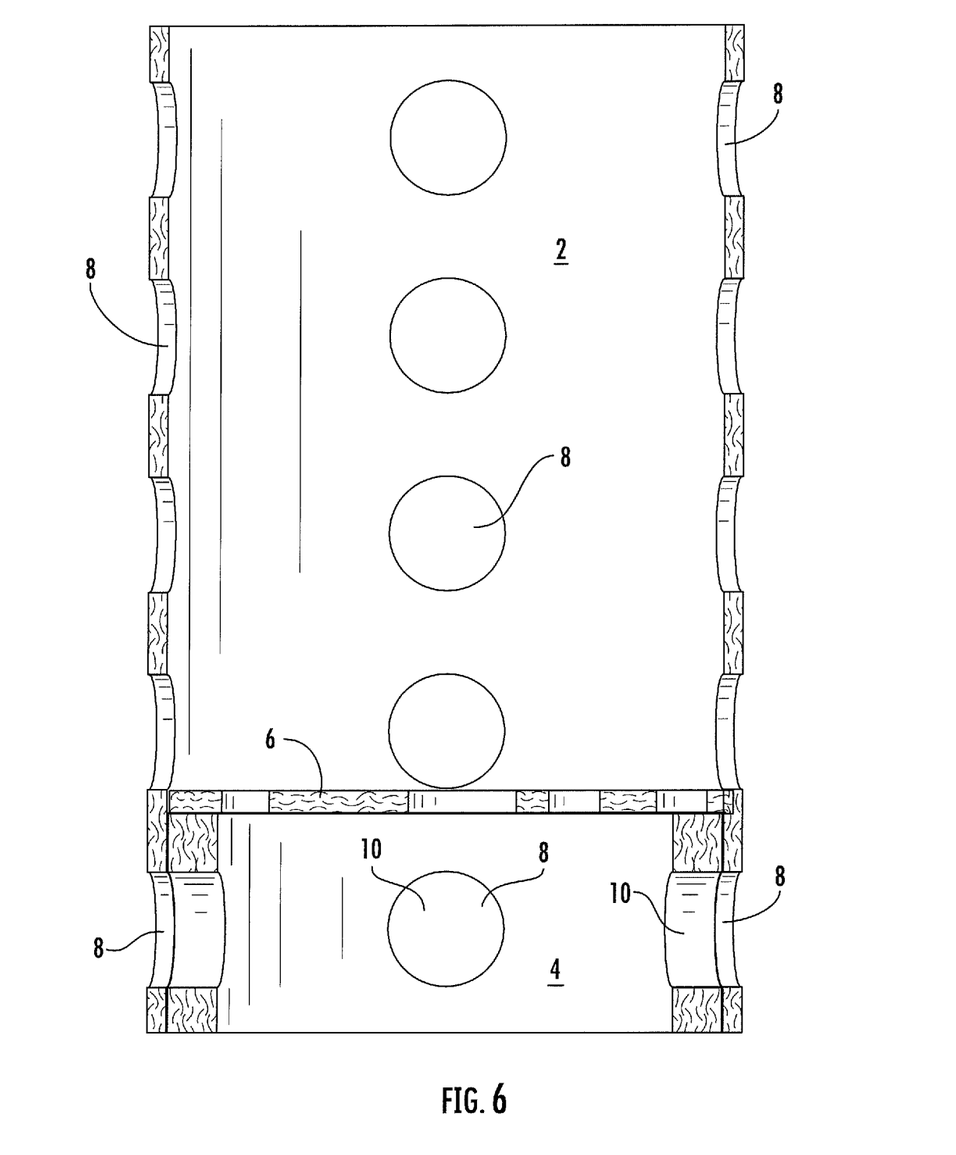
FIG. 6 is a side sectioned view of the assembled fire starter tube showing basic elements according to the invention.

In use, the label 14 is removed from the outside of the flammable tube 2. The label is preferred to be formed so as to be peelable from the flammable tube and easily removed from the flammable tube by the consumer. The construct, with solid fuel 12 in position, is placed within a nonflammable container, such as a cooking grill 16. FIG. 3. The end caps may be removed from the flammable tube, although if the end caps are formed of flammable material, removal may not be necessary since the holes in the sides of the flammable tube provide air for combustion.

As shown in FIG. 7, the label 14 may be positioned underneath the support member after removal to kindle the solid fuel, since the preferred relatively thin paper material of the label ignites easily. A flame from a match 20 or lighter may be introduced through holes in the flammable tube 2 and second flammable tube 4 to ignite the charcoal or other solid fuel.

It is preferred to use charcoal 12 in briquette form that is infused with lighter fluid so that the charcoal lights instantly. Alternatively, lighter fluid may be supplied to the solid fuel either through the top opening in the flammable tube 2, or through the holes 8 in the flammable tube.

Holes 18 formed in the support member 6 allow the flame to reach the solid fuel 12 and ignite the solid fuel. When the flammable tube 2 has been substantially consumed by the burning solid fuel and the solid fuel is sufficiently ignited, the solid fuel may be spread within the grill 16 or other nonflammable container and used as a heat source.

What is claimed:

1. A fire starter tube, comprising:
   a flammable tube comprising a plurality of air passages formed along a length of the flammable tube;
   a second flammable tube that is positioned at a lower end of the flammable tube and within an interior of the flammable tube, wherein the second flammable tube is shorter than the flammable tube and extends from the lower end of the flammable tube and along a length of a lower portion of the flammable tube;
   a support member, wherein the support member is present in the interior of the lower portion of the flammable tube, and wherein the support member is positioned on and above the second flammable tube and is supported by the second flammable tube;
   wherein the second flammable tube has a wall thickness that is greater than the wall thickness of the flammable tube; and
   solid fuel positioned on and supported by the support member and occupying an area of the flammable tube that is opposite the support member from the second flammable tube.

2. The fire starter tube of claim 1, wherein the upper end of the flammable tube is open.

3. The fire starter tube of claim 1, wherein the support member comprises air passages formed therein.

4. The fire starter tube of claim 1, wherein the flammable tube is formed of paper.

5. The fire starter tube of claim 1, wherein the flammable tube and the support member are formed of paper.

6. The fire starter tube of claim 1, wherein the charcoal is formed in briquets, and the charcoal formed in briquets is infused with lighter fluid.

7. The fire starter tube of claim 1, further comprising a flammable and peelable covering that covers an exterior of the flammable tube and covers air passages of the flammable tube.

8. The fire starter tube of claim 1, further comprising a flammable peelable covering that covers an exterior of the flammable tube and covers air passages of the flammable tube, a top lid that covers a top opening of the flammable tube and is removable from the flammable tube, and a bottom lid that covers a bottom opening of the flammable tube.

9. The fire starter tube of claim 1, wherein the plurality of air passages formed along a length of the flammable tube open to an exterior of the flammable tube, and the second flammable tube that is positioned within the flammable tube comprises air passages that align with air passages of the flammable tube.

10. The fire starter tube of claim 1, wherein the plurality of air passages formed along the length of the flammable tube open to an exterior of the flammable tube, and the second flammable tube that is positioned within the flammable tube comprises air passages that align with air passages of the flammable tube, and wherein the support member has perforations therein, and wherein the air passages formed along the length of the flammable tube communicate air through the air passages of the second flammable tube and the perforations of the support member and to the solid fuel.

11. The fire starter tube of claim 1, wherein a bottom surface of the second flammable tube extends to a bottom surface the of the flammable tube.

12. The fire starter tube of claim 1, wherein the flammable tube is cylindrical in shape.

13. The fire starter tube of claim 1, wherein the flammable tube is cylindrical in shape and the second flammable tube is cylindrical in shape, the second flammable tube having a smaller circumference than the flammable tube and the second flammable tube being positioned concentrically with the flammable tube in an interior of the flammable tube.

14. The fire starter tube of claim 1, wherein a cap that is removable from the flammable tube covers an end of the flammable tube.

15. The fire starter tube of claim 1, wherein the plurality of air passages formed along a length of the flammable tube open to an exterior of the flammable tube and extend above the support member.

16. The fire starter tube of claim 1, wherein the flammable tube is cylindrical in shape and the second flammable tube is cylindrical in shape, the second flammable tube having a smaller circumference than the flammable tube and the second flammable tube being positioned concentrically with the flammable tube in an interior of the flammable tube, wherein the outside diameter of the second flammable tube and the inside diameter of the flammable tube are sized so that the fit of the second flammable tube within the flammable tube retains the second flammable tube within the interior of the flammable tube.

17. The fire starter tube of claim 1, further comprising a wrap for the fire starter tube that provides a label having indicia formed thereon, wherein the wrap covers the exterior of the flammable tube.

18. The fire starter tube of claim 1, wherein an outside surface of the second flammable tube contacts an inside surface of the flammable tube.

19. The fire starter tube of claim 1, wherein the flammable tube is cylindrical in shape and the second flammable tube is cylindrical in shape, the second flammable tube having a smaller circumference than the flammable tube, and the second flammable tube being positioned concentrically with the flammable tube, and an outside diameter of the second flammable tube contacts an inside diameter of the flammable tube.

20. The fire starter tube of claim 1, wherein the second flammable tube has an air passage formed in a side of the second flammable tube, and the air passage is aligned with an air passage formed along the length of the flammable tube and, the aligned air passages provide access to an interior of the second flammable tube.

* * * * *